US012636135B2

(12) United States Patent
Gerhardt et al.

(10) Patent No.: US 12,636,135 B2
(45) Date of Patent: May 26, 2026

(54) ORAL CARE DEVICE AND METHOD

(71) Applicant: KONINKLIJKE PHILIPS N.V., Eindhoven (NL)

(72) Inventors: Lutz Christian Gerhardt, Eindhoven (NL); Neil Francis Joye, Waalre (NL); Mark Thomas Johnson, Arendonk (BE); Achim Rudolf Hilgers, Alsdorf (DE); Amir Hussein Rmaile, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 609 days.

(21) Appl. No.: 17/927,694

(22) PCT Filed: May 20, 2021

(86) PCT No.: PCT/EP2021/063407
§ 371 (c)(1),
(2) Date: Nov. 24, 2022

(87) PCT Pub. No.: WO2021/239554
PCT Pub. Date: Dec. 2, 2021

(65) Prior Publication Data
US 2023/0218376 A1 Jul. 13, 2023

(30) Foreign Application Priority Data
May 28, 2020 (EP) ..................................... 20176967

(51) Int. Cl.
*A61C 17/00* (2006.01)
*A46B 15/00* (2006.01)
*B08B 7/00* (2006.01)

(52) U.S. Cl.
CPC .......... *A61C 17/00* (2013.01); *A46B 15/0006* (2013.01); *A46B 15/0022* (2013.01); *B08B 7/00* (2013.01); *A46B 2200/1066* (2013.01)

(58) Field of Classification Search
CPC .............. B08B 7/00; A46B 2200/1066; A46B 15/0022; A46B 15/0006; A46B 15/0066; A61C 17/00
See application file for complete search history.

(56) References Cited

U.S. PATENT DOCUMENTS 9,913,530 B2 * 3/2018 Ye ........................ A61C 17/221
10,201,701 B2 2/2019 Levi
(Continued)

FOREIGN PATENT DOCUMENTS

EP          3101807 A1    12/2016
JP      2016523668 A      8/2016
(Continued)

OTHER PUBLICATIONS

International Search Report and Written Opinion Dated Jul. 27, 2021 for International Application No. PCT/EP2021/063407 Filed May 20, 2021.
(Continued)

*Primary Examiner* — Katina N. Henson

(57) ABSTRACT

An oral care device (8) adapted to generate an RF field for performing an oral cleaning function. The device includes a cleaning unit (10) for receipt in the mouth which includes a conductor arrangement (18, 19) which is driven with a drive signal to generate an RF field which cleans surfaces in the mouth. Means is further provided for sensing an electrical or electromagnetic signal arising from interaction of the RF energy with bodies in the mouth, for performing a sensing function with the same RF system components used for generating the RF field for cleaning or treatment.

15 Claims, 5 Drawing Sheets

(56)     References Cited

U.S. PATENT DOCUMENTS

| | | |
|---|---|---|
| 2012/0266397 A1 | 10/2012 | Iwahori |
| 2015/0230593 A1 | 8/2015 | Doll et al. |
| 2017/0020277 A1* | 1/2017 | Barnes ............... A46B 15/0034 |
| 2017/0027675 A1 | 2/2017 | Nahshon |
| 2020/0093255 A1* | 3/2020 | Mediratta .......... A61C 17/3472 |

FOREIGN PATENT DOCUMENTS

| | | |
|---|---|---|
| WO | 2016051400 A1 | 4/2016 |
| WO | 2017216606 A1 | 12/2017 |
| WO | 2018127482 A1 | 7/2018 |
| WO | 2020126878 A1 | 6/2020 |

OTHER PUBLICATIONS

Silk'n Australia "ToothWave—Way Beyond Brushing" https://www.youtube.com/watch?v=orTsVwZLC10.

Dhinahar Sundararaj et al "Critical evaluation of incidence and prevalence of white spot lesions during fixed orthodontic appliance treatment: A meta-analysis" National Center for Biotechnology Information J Int Soc Prev Community Dent. Nov.-Dec. 2015; 5(6): 433-439.

Mizrahi, E. "Enamel demineralization following orthodontic treatment" Am J Orthod. Jul. 1982;82(1):62-7. doi: 10.1016/0002-9416(82)90548-6. https://pubmed.ncbi.nlm.nih.gov/6984291/https://www.sciencedirect.com/science/article/abs/pii/0002941682905486?via%3Dihub.

Gorelick et al "Incidence of white spot formation after bonding and banding" Am J Orthod. Feb. 1982;81(2):93-8. doi: 10.1016/0002-9416(82)90032-x. https://pubmed.ncbi.nlm.nih.gov/6758594/ (Abstract).

Mitchell, L. "Decalcification during orthodontic treatment with fixed appliances—an overview" Br J Orthod. Aug. 1992; 19(3):199-205. doi: 10.1179/bjo.19.3.199. https://pubmed.ncbi.nlm.nih.gov/1390575/ (Abstract).

* cited by examiner

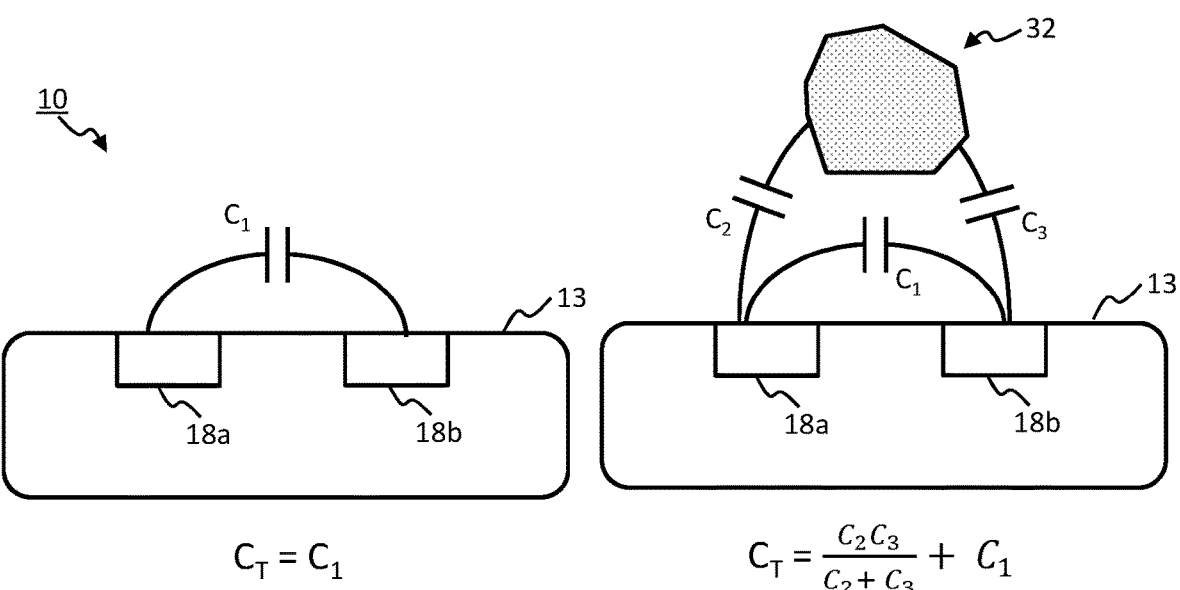
$$C_T = C_1$$
FIG. 5a
$$C_T = \frac{C_2 C_3}{C_2 + C_3} + C_1$$
FIG. 5b
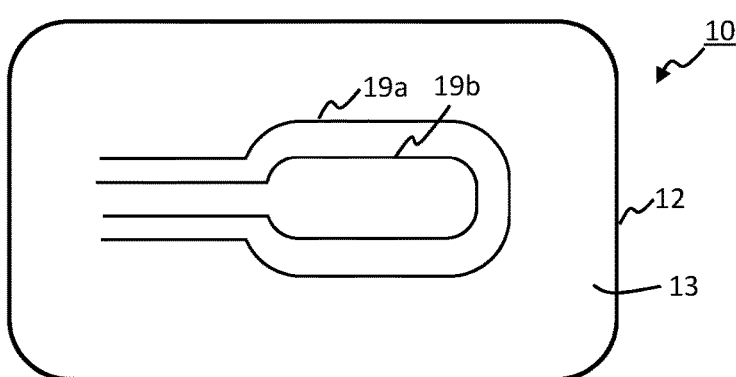
FIG. 6
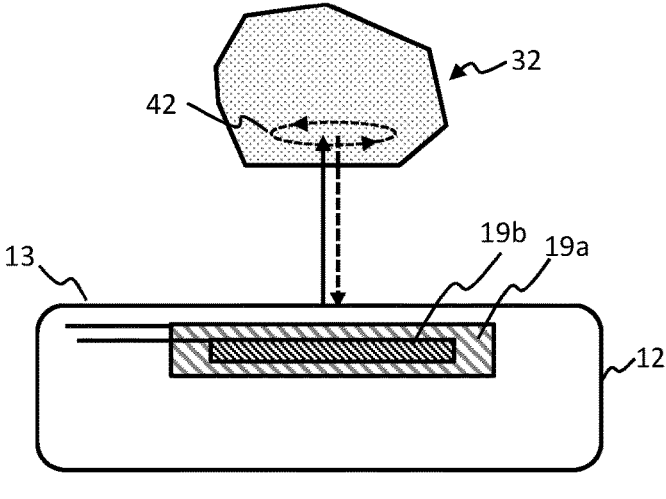
FIG. 7

ORAL CARE DEVICE AND METHOD

This application is the U.S. National Phase application under 35 U.S.C. § 371 of International Application No. PCT/EP2021/063407, filed on May 20, 2021, which claims the benefit of EP application Ser. No. 20/176,967.6, filed May 28, 2020. These applications are hereby incorporated by reference herein.

FIELD OF THE INVENTION

The present invention relates to an oral care device, in particular an oral care device employing electromagnetic radiation for a cleaning and/or treatment function.

BACKGROUND OF THE INVENTION

Electromagnetic emissions can be used to provide a cleaning function in the oral cavity. In particular, an oral care device can include a cleaning and/or treatment unit, such as a head portion, for insertion into an oral cavity of a user, which cleaning unit portion includes one or more conductive elements coupled to an RF signal generator. The signal generator drives the conductive elements with an RF signal which causes RF radiation to be emitted by the elements.

U.S. Ser. No. 10/201,701B2 describes a prior art electric toothbrush. The toothbrush comprises a platen, an RF generator, two RF electrodes, and a dielectric barrier situated between the two RF electrodes in the form of a silicone strip. The toothbrush also includes bristles. The dielectric barrier has a height which extends up to the level of the distal tips of the brush bristles. The barrier forces RF waves transmitted and RF field generated between the electrodes to travel over the top of the barrier, thus reaching the area where the bristles engage with the surfaces of the teeth and gums in use.

According to U.S. Ser. No. 10/201,701B2, when the RF field interacts with surfaces of the teeth and gums, it provides a cleaning function by loosening the bonds between impurities and the surfaces in the mouth. In particular, RF fields generated in this way can remove dental plaque, and also dental calculus. Staining of teeth can also be reduced.

The distal tips of the brush bristles are rubbed against the surfaces of teeth in the usual manner to clean the teeth, while at the same time, the RF electrodes emit RF waves which provide a cleaning function at the same surface which is being brushed, at the level of the tips of the bristles.

Metallic and non-metallic restorations (crowns, implants, bridges, fillings) or appliances (braces) typically are more prone to biofilm accumulation and harder to clean. 50% of orthodontic patients have white spots because of the inability to clean properly the orthodontic appliances. Detection of these foreign materials and accumulated plaque on these areas are needed to optimize cleaning.

SUMMARY OF THE INVENTION

The invention is defined by the claims.

According to examples in accordance with an aspect of the invention, there is provided an oral care device, comprising:

a cleaning unit for receipt in an oral cavity of a user, the cleaning unit comprising at least one conductor arrangement, adapted to generate an RF field responsive to receipt of an RF drive signal;

an RF generator arranged to supply an RF drive signal to the at least one conductor arrangement to induce an RF field, the RF field adapted to perform an oral cleaning or treatment function during use; and a controller arranged to receive and process a sensed electrical or electromagnetic signal caused by interaction of the generated RF field with foreign objects in the oral cavity.

Embodiments of the invention are based on providing an RF-based oral care device which additionally comprises functionality for sensing, the sensing for example being based on the same system components as used to generate the RF field. The device settings may then be adapted based on the sensed interaction. Thus, the additional sensing capability is enabled but without requiring a change to the form factor of the device.

The oral care device uses RF energy to provide a cleaning and/or treatment function in the mouth.

The sensed electrical or electromagnetic signal, i.e. sensing data, can be useful for a wide range of purposes. For example it can be used to sense presence of foreign bodies in the mouth, based on electrical characteristics of the sensed signal. According to one or more embodiments, this may be used to adapt a cleaning and/or treatment functionality of the device based on the detection.

Although reference is made above to a cleaning unit, it is to be understood that the cleaning unit may provide a cleaning and/or treatment function. Reference in this disclosure therefore to a cleaning unit may be understood as reference to a cleaning and/or treatment unit. The cleaning unit may for example be a detachable component releasably coupleable with a body portion or control unit portion of the device which houses the RF generator and controller. The body portion or control unit portion may be provided on its own according to a further aspect, and be adapted to couple electrically and mechanically with the cleaning and/or treatment unit to supply the RF drive signal to the at least one conductor arrangement and receive signals from the at least one conductor arrangement.

The conductor arrangement comprises at least one conductive body operable to generate an electromagnetic field responsive to energizing by the RF drive signal. For example, it may comprise one or more electrodes or one or more coils.

The device may include means for sensing an electrical or electromagnetic signal caused by interaction of the generated RF field with foreign objects in the oral cavity. The means may be provided at least in part by the conductor arrangement. The means may be provided by the RF generator circuit comprising the RF generator and the conductor arrangement. In further examples, the means may be provided by a separate dedicated sensing arrangement, comprising one or more sensing elements.

According to some embodiments, the electrical or electromagnetic signal may be sensed using the at least one conductor arrangement. Here, advantageously the same component(s) used to emit the RF field are also used to sense the returned signal.

According to some embodiments, the controller may be adapted to adjust an operation of the oral care device based upon the received and processed signal.

The controller may be adapted to recurrently or continuously adjust an operation of the oral care device based upon the received and processed signal (for example throughout or during generation of the RF field by the RF generator).

Adjustment of the operation of the oral care device may be performed dynamically and in real time during operation. The recurrent or continuous adjustment may be performed throughout an operation session, for example throughout a period of RF generation by the RF generator.

A control or feedback loop or path may be implemented between the controller and the RF generator, such that the operation of the oral care device is automatically adjusted based on the sensing data The controller may be adapted to detect foreign (solid) objects in the RF field based on receiving and processing a sensed electrical or electromagnetic signal caused by interaction of the generated RF field with foreign objects in the oral cavity.

According to one or more embodiments, the at least one conductor arrangement and the RF generator may together form an RF generation circuit, and wherein sensing of the electrical or electromagnetic signal is based on detecting variation in one or more electrical characteristics of the RF generation circuit, such as the voltage or impedance change at electrodes of the conductor arrangement.

Hence here, the same circuit used to generate the signal can be re-utilized for sensing, while still being able to simultaneously perform its primary function (of the supply of RF energy).

According to one or more embodiments, the controller may be adapted to process the sensed electrical or electromagnetic signals to detect presence of an object or entity in the RF field. It may be adapted to detect presence of a solid object or entity in the RF field.

According to one or more embodiments, the controller may be adapted to process the sensed electrical or electromagnetic signals to determine or identify an object or entity present in the generated RF field. Here, the controller is able to perform differential identification of the object.

This may be based on characteristics of the sensed interaction signal, for instance, voltage, current, impedance amplitude, frequency or phase.

The detection may enable distinguishing metal objects from non-metal objects.

According to at least one set of embodiments, the oral care device may be operable in a plurality of mechanical and/or fluidic cleaning and/or treatment modes, and wherein the controller is adapted to configure or select the mode based on the sensed electrical or electromagnetic signal.

Here, the cleaning or treatment operation of the device is adapted based on the results of the sensing. For examples, the sensing information may indicate a type of body or structure which is in the RF field, and based on this a most appropriate mode can be selected.

The cleaning and/or treatment mode may be configured or selected by adapting device settings (e.g. RF frequency, duty cycles, drive train amplitude, motion, flossing characteristics), for example allowing a personalized or optimized treatment procedure.

By way of example, a duration of cleaning and/or treatment may be configured based on the sensed signal.

The device may also have a user training mode. The training mode for example involves sending and displaying sensor measurement data to remote devices or giving feedback/advice, allowing a user to personalize or customize oral care procedures.

There are at least two main sensing approaches which can be followed according to embodiments of the invention: complex impedance based, preferably but not limited to capacitive-based sensing, and inductive based sensing.

Capacitive-based sensing will first be discussed.

According to one or more embodiments, the conductor arrangement may comprise at least one pair of electrodes, the electrodes spaced from one another, and the electrodes adapted to generate an RF field in an area around and between the electrodes responsive to receipt of an alternating drive signal applied to the electrodes.

The alternating drive signal may be applied between the electrodes so that an alternating potential difference is induced between the electrodes. Hence the pair of electrodes effectively forms a capacitor arrangement coupled across an AC supply voltage.

This embodiment effectively provides a capacitive sensing arrangement, and allows foreign objects to be detected based on directly or indirectly detecting changes to the effective capacitance between the electrodes. This can be detected based on analyzing electrical characteristics of the circuit comprising the electrodes for example. These electrical characteristics may include one or more of voltage, current and impedance for example. Detection can be based on detecting variations in electrical characteristics of the drive signal to the electrodes in some examples. Preferably the analysis involves current measurement. This can be done simultaneously with signal generation in some examples.

According to one or more embodiments, the oral cleaning unit may comprise a support structure with a support surface, and wherein the at least one pair of electrodes is arranged protruding outward from the support surface.

The arrangement permits detecting of objects brought into the space between the protruding electrodes for example.

A proximal end of each protruding member may be coupled to the support surface at a respective location on the support surface, the respective locations being spaced apart so that a gap is defined between the pair of electrodes.

According to one or more embodiments, the cleaning unit may comprise at least one pair of protruding members extending outward from a surface of the support body, each protruding member comprising one of the at least one pair of electrodes, the protruding members spaced from one another.

The cleaning unit may further comprise a plurality of bristles for cleaning teeth, extending outward from the support surface of the cleaning unit in a same general direction as the protruding members.

According to one or more embodiments, the sensing of the electrical or electromagnetic signal may be based on sensing variations in a complex impedance of the generator circuit.

This embodiment may enable more robust or reliable detection of objects or entities in the RF field, as distinguished from non-object related artefacts which may be present in the generator circuit signal.

By instead measuring variations in the total complex impedance of the sensed signal, which includes resistance and reactance parts, object detection can be made more robust against movement artefacts.

A further main sensing approach according to one or more embodiments is inductive-type sensing.

For example, according to one more embodiments, the at least one conductor arrangement may comprise at least one inductive coil or loop, wherein sensing of the electrical or electromagnetic signal comprises sensing a change in an impedance of a circuit containing the at least one coil.

This may be a generator circuit or a separate sensing circuit.

The conductor arrangement may in some examples comprise a single inductive coil or loop which is used both for RF field generation and for sensing.

Optionally, the coil may be driven according to a transmit/receive duty cycle, wherein the coil is alternated between a signal generation phase or mode and a signal sensing phase or mode.

Alternatively, simultaneous sensing and signal generation can be achieved in further examples based on monitoring variation in an impedance of the generator circuit while driving the coil with the drive signal. Simultaneous sensing and generation can be based for example on detecting variations in amplitude, frequency or phase of the generator circuit drive signal for example.

According to certain examples, the cleaning unit may comprise a support structure having an outer support surface, and wherein the at least one inductive coil is integrated in the support structure, beneath the support surface, for example embedded in the support structure beneath the support surface.

According to one or more embodiments, the controller may be adapted to process the sensed electrical or electromagnetic signal to detect presence of a metal object.

The controller may be adapted in some examples to determine whether a metal object is exposed, or non-exposed (e.g. a metal implant).

According to one or more embodiments, the oral care device may further comprise a body portion which houses the RF generator and the controller, the body portion being mechanically and electrically coupleable to the cleaning unit. The body portion may form a handle for the device. The body portion may be provided by itself according to a further aspect of the invention.

The cleaning unit may be releasably coupleable with the body portion in some examples. For example it may be in the form of a head for an oral care device, such as a toothbrush, oral irrigation device, flossing device, (partial) brushing mouthpiece, multi-surface cleaning device or any other type of oral cleaning and/or treatment device.

According to one or more embodiments, the cleaning unit may further comprise a plurality of bristles for cleaning teeth, extending outward from a support surface of the cleaning unit. The device may be a toothbrush device for instance or a mouthpiece unit comprising bristles.

According to one or more embodiments, the device may further comprise a mechanical oscillation mechanism arranged to oscillate a support surface of the cleaning unit at a first frequency, and wherein oscillation at said first frequency causes the bristles to oscillate. The oscillation system may use a combination of motions and frequencies in different dimensions (e.g. a tapping up-down motion combined with a rotation or sweeping motion). More complex motions are also possible.

Examples in accordance with a further aspect of the invention provide a method, comprising:

generating and supplying an RF drive signal to at least one conductor arrangement of an oral cleaning unit, the cleaning unit for receipt in an oral cavity of a user, and the conductor arrangement adapted to generate an RF field responsive to receipt of the RF drive signal, and the RF field adapted to perform an oral cleaning and/or treatment function during use;

sensing an electrical or electromagnetic signal caused by interaction of the RF field with foreign objects in the oral cavity, and receiving and processing the sensed electrical and electromagnetic signal.

In some examples, the sensing may be performed using the at least one conductor arrangement used to generate the RF field.

The method may further comprise adjusting an operation of the oral care device based upon the received and processed signal.

The method may further comprise an initial step of inserting the oral cleaning unit into the oral cavity of a user, and performing the remaining steps of the method with the cleaning unit received in the mouth of the user.

Examples in accordance with a further aspect of the invention provide a computer program product comprising computer program code, the computer program code being executable on a processor or computer, wherein, when the processor or computer is operatively coupled with an RF generator of an oral care device, the RF generator operatively coupled to at least one conductor arrangement, the code is configured to cause the processor to perform a method in accordance with any example or embodiment outlined above or described below, or in accordance with any claim of this application.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 5 illustrates the principles of capacitive sensing according to one or more embodiments;

FIG. 6 illustrates a cleaning unit according to an example oral care device operating according to inductive sensing principles;

FIG. 7 illustrates the principles of inductive sensing according to one or more embodiments;

DETAILED DESCRIPTION OF THE EMBODIMENTS

Figure 1:
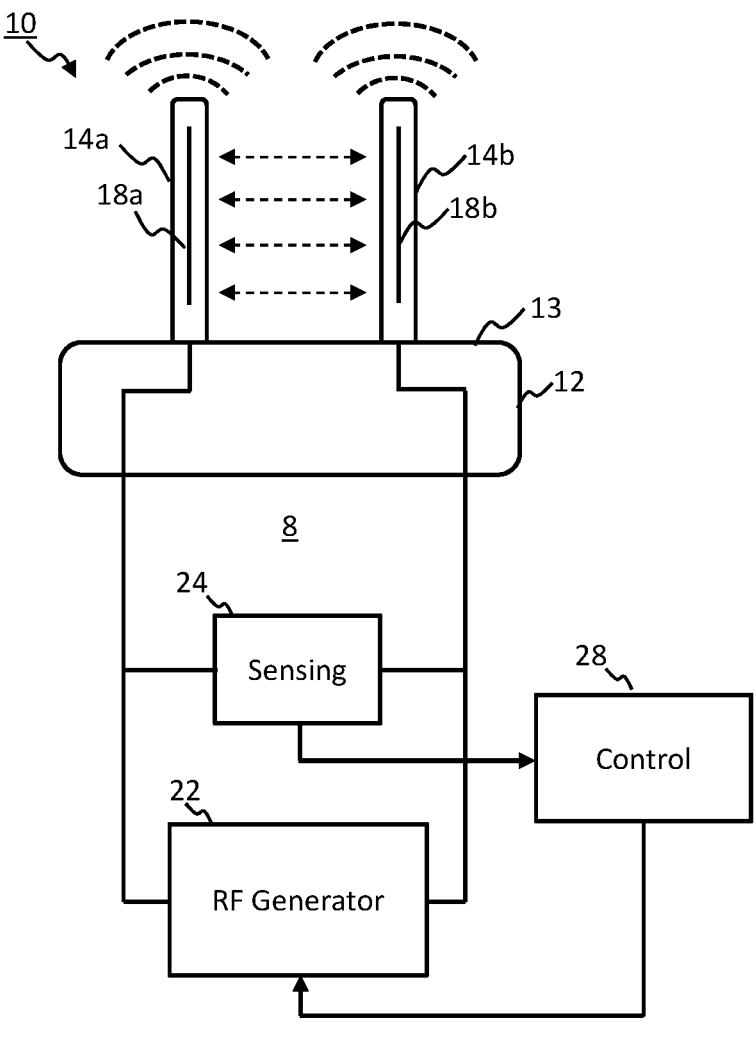
FIG. 1 illustrates components of a first example oral care device according to one or more embodiments.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an oral care device adapted to generate an RF field for performing an oral cleaning function. The device includes a cleaning unit for receipt in the mouth which includes a conductor arrangement which is driven with a drive signal to generate an RF field which cleans surfaces in the mouth. Means are further provided for sensing an electrical or electromagnetic signal arising from interaction of the RF energy with foreign bodies in the mouth, for performing a sensing function.

Thus embodiments are based on utilizing the RF cleaning field to advantageously perform sensing concurrently with the cleaning. The sensed interaction signal can in some embodiments be used to inform the characteristics or the mode of cleaning by the device.

By way of example, metallic and non-metallic dental restorations (e.g. crowns, bridges, dentures, inlays, implants, screws, fillings) or appliances (wires, braces) are very common in the mouth. These foreign materials can typically give rise to sites which are more prone to the formation of dental biofilm and/or accumulation of dental plaque, and can be harder to clean through a normal cleaning routine (e.g. brushing, flossing). These materials in the mouth can provide a shelter for bacteria to collect and multiply, and evade removal with standard oral cleaning devices.

This can lead to localized oral health issues such as gingivitis and dental caries. In the case of orthodontic patients, white spot lesions can commonly form. An estimated 50% of orthodontic patients have white spots on their teeth due to the inability to properly clean the orthodontic appliances. These white spot lesions are for example caused by locally demineralized tooth enamel due to poor cleaning around brackets.

As discussed above, RF fields are an advantageous cleaning solution or aid for mechanical cleaning, since such fields can penetrate to surfaces and crevices which are hard to reach with physical cleaning means such as bristles, floss or even with fluidic cleaning.

It would be advantageous to further include in such RF oral care devices means for sensing objects which are in the presence of the field, adjacent the device RF transmitter. It would be useful if such sensing means were of a form and modality which could permit distinguishing between different types of foreign objects in the oral cavity. This information could be communicated to a user operating the device, to help them navigate the device around their mouth or to adapt the mode of cleaning performed according to the type of foreign object or structure being engaged by the device. In some cases, it would be valuable if the device itself included means for adapting a cleaning action or operation based on the sensing results.

Embodiments of the present invention are aimed at addressing one or more of these problems.

According to examples in accordance with an aspect of the invention, there is provided an oral care device, comprising:

a cleaning unit for receipt in an oral cavity of a user, the cleaning unit comprising at least one conductor arrangement, adapted to generate an RF field responsive to receipt of an RF drive signal;

an RF generator arranged to supply an RF drive signal to the at least one conductor arrangement to induce an RF field, the RF field adapted to perform an oral cleaning or treatment function when the cleaning unit is received in an oral cavity;

the device further adapted to sense an electrical or electromagnetic signal caused by interaction of the generated RF field with foreign objects in the oral cavity, and the device further comprising a controller arranged to receive and process the sensed electrical and electromagnetic signal.

The oral care device uses RF energy to provide a cleaning and/or treatment function in the mouth.

Although reference is made to a cleaning unit, it is to be understood that the cleaning unit may provide a cleaning and/or treatment function. Reference in this disclosure therefore to a cleaning unit may be understood as reference to a cleaning and/or treatment unit.

FIG. 1 schematically illustrates components of a first example oral care device 8 according to one or more embodiments.

The device 8 comprises a cleaning unit 10 for receipt in an oral cavity of a user. The cleaning unit comprises a support structure or body 12, having a support surface 13. The cleaning unit comprising a conductor arrangement which in this case takes the form of a pair of electrodes 18a, 18b, spaced from one another, and adapted to generate an RF field responsive to receipt of an RF drive signal.

In this example, the at least one pair of electrodes 18a, 18b is arranged protruding outward from the support surface 13.

A proximal end of each electrode 18a, 18b is coupled to the support surface 13 at a respective location on the support surface, the respective locations being spaced apart so that a gap is defined between the pair of electrodes. More than one pair of electrodes may be provided in further examples.

Figure 2:
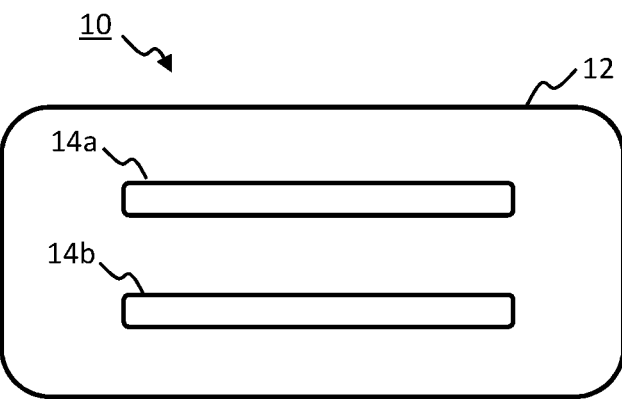
FIG. 2 illustrates a plan view of an example cleaning unit of an oral care device.

In this particular example, the cleaning unit 10 comprises a pair of protruding members 14a, 14b, extending outward from the surface 13 of the support body 12, and wherein each of the electrodes 18a, 18b is comprised by one of protruding members. By way of example, each protruding member 14a, 14b may take the form of or comprise a sheet-like structure. This example is illustrated in FIG. 2 for instance which shows a top-down (plan) view of an example cleaning unit 10. Each protruding member defines a plane, and the members are arranged with their respective planes in parallel, and with a major planar surfaces of the members facing one another. This is not essential however, in other examples the protruding members may define a rod or shaft shaped member for instance. The electrodes may be for example be integrated into a brushing filament or bristle, or they may be independent elements.

The protruding members may be flexible in some examples and they may then resiliently deflect, for example responsive to suitable mechanical interaction or forcing. This allows the RF intensity distribution of the RF fields generated by the electrodes to be spread across a wider area, or simply for the high intensity regions to be moved around to cover different areas as a user moves the cleaning unit across their teeth (in the case for example that the cleaning unit is a head for a toothbrush, which can be moved across the teeth).

In the example of FIG. 1, the electrodes 18a, 18b are integrated inside (e.g. embedded within) the protruding members 14a, 14b. However they may in further examples be carried on a surface of the protruding members for instance.

The protruding members are not essential and the electrodes may alternatively be provided on their own, for example protruding from the surface 13.

In certain examples, the cleaning unit 10 may further comprise a plurality of mechanical cleaning elements (e.g. bristles, pillars, prophy cup) for cleaning teeth, extending outward from the support surface 13 of the cleaning unit in a same general direction as the electrodes. However, this is not essential.

The device 8 further includes an RF generator 22 which is electrically coupled to the electrodes 18a, 18b and arranged to supply an RF drive signal to the pair of electrodes to induce generation of an RF field. The RF field is adapted to perform an oral cleaning function when the cleaning unit is received in an oral cavity.

RF fields can be used for example with frequencies anywhere in the range of 3 kHz-300 GHz, for example 500 kHz-30 MHz.

The electrodes 18a, 18b are adapted to generate an RF field in an area around and between the electrodes responsive to receipt of an alternating drive signal applied to the electrodes by the RF generator 22.

The alternating drive signal may be applied between the electrodes 18a, 18b so that an alternating potential difference is induced between the electrodes. Hence the pair of electrodes effectively forms a capacitor arrangement coupled across an AC supply current or voltage source from the RF generator.

The device 8 further includes means permitting sensing of an electrical or electromagnetic signal caused by interaction of the generated RF field with foreign objects in the oral cavity. In the example of FIG. 1, a sensing unit 24 is provided which is electrically coupled to the pair of electrodes 18a, 18b. The sensing unit 24 is adapted to sense variations in electrical characteristics of the interaction signal arising from interaction of the RF field with a foreign object. The interaction signal is received from the electrodes or passing to the electrodes for example.

In the example of FIG. 1, the sensing unit 24 is connected in electrical parallel with the pair of electrodes (and with the RF generator), meaning it is operable to sense variations in a voltage between the electrodes.

Figure 3:
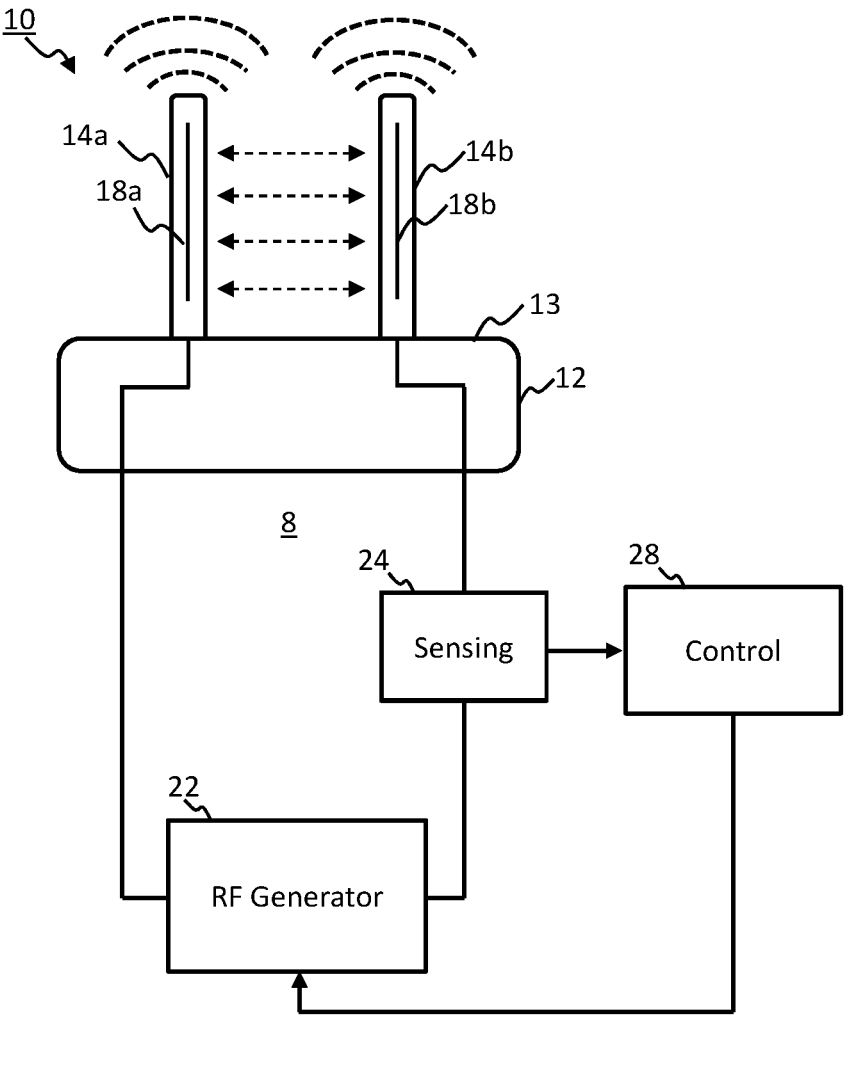
FIG. 3 illustrates components of a further example oral care device according to one or more embodiments.

In further examples, a sensing unit 24 may be provided in a different electrical arrangement, for example connected in series with one or more of the electrodes 18a, 18b. An example of this arrangement is shown in FIG. 3 for example, which depicts an example device which is the same as that of FIG. 1 except for the configuration of the sensing unit 24. In FIG. 3, the RF generator is a voltage generator 22, while the interaction signal is measured using a current sensor 24 comprising the RF generation circuit. Thus, FIG. 1 shows a current generator in combination with a voltage sensor whereas FIG. 3 shows the use of a voltage generator in combination with a current sensor.

In each case, the device 8 further comprises a controller 28 which is arranged to receive and process the sensed electrical and electromagnetic signal from the sensing unit 24.

Preferably the controller 28 may be further communicatively or operatively coupled to the RF generator 22 such that the results of the analysis of the sensed interaction signal from the sensing unit 24 can be used to inform the RF drive scheme implemented by the RF generator.

In some examples, the controller 28 may be adapted to control the operation of the RF generator 22 based on the sensed interaction signal.

The conductor arrangement comprising the electrodes 18a, 18b, and the RF generator 22 can be understood as together forming an RF generation circuit. In the example of FIG. 1 and FIG. 3, the sensing unit 24 is arranged electrically connected to this circuit, such that sensing of the electrical or electromagnetic signal returned from the oral cavity is based on detecting variation in one or more electrical characteristics of the RF generation circuit.

Hence here, the same circuit used to generate the signal is-utilized for sensing. However, this is not essential, and in further examples a separate sensing circuit may be provided electrically coupled to the electrodes 18a, 18b arranged to sense signals received at the electrodes.

Furthermore, it is noted that although in the examples of FIGS. 1 and 3, the same conductor arrangement (the at least one pair of electrodes 18a, 18b) is used to sense the electrical or electromagnetic signal from the oral cavity, this is not essential but preferred, and in further examples a separate conductor arrangement may be provided for sensing, or a separate one or more electrodes may be provided for sensing. This may provide a simpler way to implement simultaneous sensing and signal generation. However, use of the same electrodes 18a, 18b for sensing and RF field generation as in the example of FIGS. 1 and 3 is advantageous since it minimizes the number of parts.

In operation, the RF generator 22 generates a drive signal which is supplied to the at least one pair of electrodes 18a, 18b. The drive signal induces generation by the electrodes of an RF field in the space between and around the electrodes.

Signal generation and signal sensing may be performed alternately, in a duty cycle operation in some examples, so that an RF field is generated for one portion of the duty cycle, before the RF generator 22 is deactivated, and the sensing unit 28 senses electrical characteristics in the electrode circuit to detect any returned signals. Alternatively, sensing and RF field generation may be performed simultaneously based on monitoring variations in the drive signal to the electrodes during RF field generation. Variations in for example the capacitance between the electrodes, as sensed e.g. by changes in the voltage between the electrodes, may be used to provide a sensed interaction signal.

According to one or more embodiments, the controller 28 may be adapted to process the sensed electrical or electromagnetic interaction signals to determine or identify an object or entity present in the generated RF field. For example, it may be adapted to distinguish between oral tissue and an artificial object or foreign body. It may be operable to determine a type of artificial object or foreign objects present within the field, e.g. a type of restoration or implant. By way of non-limiting example, this may include for instance determination as to whether the object is a crown, bridge, denture, inlay, implant, screw, filling or any other type of dental restoration. It may be operable to determine a material which the object is made from polymer or metal and thus differentiate from sound tooth enamel.

This identifying of the foreign body or object in the RF field may be based for example on electrical characteristics of the sensed signal, for instance, a complex impedance, voltage, current, amplitude, and/or frequency of the signal. For example, different foreign materials and different structures may have different RF absorption characteristics, so that an amplitude or a power of a returned RF wave, sensed at the electrodes 18a, 18b, may be used to identify the material, shape or structure of the foreign object.

In some examples, the device may include a memory, communicatively coupled to the controller, the memory storing a reference dataset, e.g. a lookup table, recording reference signal characteristics for each of a plurality of different possible objects or entities. These could be organic, e.g. different types of oral structure (different teeth etc.), or artificial/foreign bodies. Thus, the system is able to distinguish between tissue and different types of artificial/foreign bodies.

According to one or more embodiments, the controller 28 may be adapted to adjust device operation parameters or cleaning and/or treatment functionality, or change a mode of operation of the device, based on the sensed interaction signals from the sensing unit 24. For example, based on a type of object or body which is detected within the RF field, the cleaning mode may be adjusted to provide the most appropriate cleaning or treatment. For instance, and as discussed above, certain dental restoration features are prone to collection of biofilm and bacteria. Thus, responsive to detecting such a feature within the RF field, a more intense cleaning mode may be triggered, or a duration of a cleaning cycle may be increased for example.

Adaptation of the functionality of the oral care device based on sensing may include, but is not limited to, adaptations of the RF field generation settings (e.g. RF frequency or duty cycles) and also settings related to other cleaning or treatment functionality of device.

For instance, according to one or more embodiments, the cleaning unit may comprise bristles for cleaning teeth, and the device may include a mechanical oscillation mechanism arranged to oscillate the cleaning unit to cause oscillation of the bristles. In some examples, an amplitude and/or frequency of the mechanical oscillation may be adjusted based on the interaction signals detected by the sensing unit 24.

According to one or more examples, the device 8 may be a dental flossing device, and wherein characteristics of the flossing functionality may be adjusted based on the sensed interaction signals.

According to at least one set of embodiments, the oral care device 8 may be operable in a plurality of mechanical and/or fluidic cleaning or treatment modes, and wherein the controller 28 is adapted to configure or select the cleaning or treatment mode based on the sensed electrical or electromagnetic interaction signal.

For example, the sensing information may indicate a type of body or structure which is present in the RF field, and based on this a most appropriate cleaning or treatment mode can be selected.

The adaptation of device functionality based on sensing will be discussed in greater detail to follow.

According to one or more embodiments, the controller 28 may be adapted to trigger certain response actions based on the sensed signals.

The response actions may include generating an information output based on the results of the processing of the sensing data by the controller 28. For example, sensing data may be communicated to a remote device, e.g. through a wireless data communication channel. Sensory feedback may be generated for a user based on the sensing information, e.g. acoustic, haptic or visual feedback.

A control or feedback loop or path may be implemented between the controller 28 and the RF generator 22, such that the operation of the oral care device 8 is automatically adjusted based on the sensing data (FIG. 1 and FIG. 3). For example, based on detecting presence of one or more metal objects in the mouth, the cleaning program or routine may be adjusted accordingly and personalized so that specialized cleaning or treatment actions are implemented at the identified metal-containing sites in the mouth, e.g. more intense cleaning or a different mode of cleaning. Feedback may in some cases be generated for a user to indicate locations which have been identified as requiring special care.

According to one or more embodiments, the controller 28 may comprise a wireless communication interface, permitting transmission and receipt of data and/or control signals. The wireless communication interface may operate with any type of wireless communication protocol, e.g. Wi-Fi or Bluetooth.

The sensing functionality of the device can be implemented in different ways. In particular, there are at least two main sensing approaches which can be followed according to embodiments of the invention: capacitive-based sensing and inductive based sensing.

The examples of FIGS. 1 and 3 discussed above operate on a complex impedance, for example capacitive-type sensing approach.

Here the conductor arrangement comprises at least one pair of electrodes 18a, 18b, the electrodes spaced from one another, and the electrodes adapted to generate an RF field in an area around and between the electrodes responsive to receipt of an alternating drive signal applied to the electrodes.

The alternating drive signal may be applied between the electrodes 18a, 18b so that an alternating potential difference is induced between the electrodes. Hence the pair of electrodes effectively forms a capacitor arrangement coupled across an RF supply generator.

This embodiment effectively provides a capacitive sensing arrangement, and allows sensing of foreign objects brought in-between the electrode based on directly or indirectly detecting changes to the effective capacitance between the electrodes. This can be detected based on the sensing unit 24 analyzing electrical characteristics of the RF generation circuit for example. These electrical characteristics may include one or more of voltage, current and impedance for example. It can be detected based on detecting variations in electrical characteristics of the drive signal to the electrodes in some examples. This can be done simultaneously with signal generation in some examples.

Figure 4:
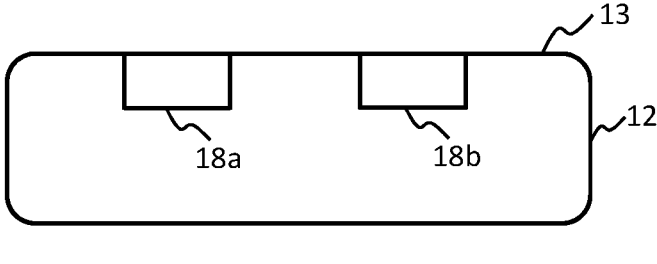
FIG. 4 illustrates electrode placement in the cleaning unit of a further example oral care device according to one or more embodiments.

Although in the example of FIGS. 1-2 and FIG. 3, the at least one pair of electrodes 18a, 18b is arranged protruding outward from the support surface 13 of the cleaning unit 10, this is not essential, and in alternative examples, the electrodes may be embedded beneath the support surface of the support structure 12. An example of this alternative arrangement is schematically illustrated in FIG. 4. The controller 28 and signal generator 22 and sensing unit 24 is not shown for simplicity of illustration, but these features may be same as those of FIG. 1 or FIG. 3 for example.

An arrangement comprising protruding electrodes 18a, 18b permits detecting of objects brought into the space between the protruding electrodes. An arrangement with embedded electrodes (or loop coils) allows detection of objects brought into the space or area above and between the electrodes for example.

In either case, when a body or structure, e.g. a foreign body, is brought into a space between the locations of the RF electrodes 18a, 18b, the total effective capacitance between the electrodes changes and this causes a detectable change in the voltage, current, impedance and/or other electrical characteristics of the circuit comprising the electrodes.

This is illustrated schematically in FIG. 5. FIG. 5a shows the effective capacitance between the electrodes (18a, 18b) when there is no object or body in the RF field. The total effective capacitance $C_T$ is equal to the capacitance between the electrodes themselves, $C_1$. FIG. 5b shows the case when an object or body 32 is brought into the RF field. Here, an additional effective capacitance is introduced, this comprising of a first object capacitance $C_2$ across the space between the first electrode 18*a* and the body 32, and a second object capacitance, $C_3$ across the space between the object and the second electrode 18*b*. As a result, the total effective capacitance between the electrodes 18*a*, 18*b* increases to $$C_T = \frac{C_2 C_3}{C_2 + C_3} + C_1.$$

The sensing unit 24 (not shown in FIG. 5) may detect this change based on detecting for example a change in voltage, current, or impedance of the circuit containing the electrodes 18*a*, 18*b*. The electrical characteristic(s) which is sensed by the sensing unit 24 may depend on the type of RF generator 22 which is used. By way of example, a voltage sensor may be implemented if the RF generator is a current generator, and a current sensor may be used if the RF generator is a voltage generator.

As discussed, optionally, the measured signal from the sensing unit 24 may then be used by the controller 28 (which may e.g. be a micro-controller) to adapt the settings of the RF generator 22, or other cleaning components of the device 8.

Experiments conducted by the inventors have shown that using the capacitive sensing approach, it is possible to distinguish for example between metal and non-metal fillings, and it is also possible to differentiate between metal-filled teeth and non-metal filled teeth.

In particular, the measured capacitance for different teeth with different types of filling (metal, polymer, no filling) results in different measurable capacitances. In general, for a more conductive object, the effective capacitance between the electrodes 18*a*, 18*b* is higher. Particular ranges of associated measurable capacitance for different foreign objects in the oral cavity may be measured in advance and stored as reference data, e.g. in a lookup table, which can then be retrieved from a memory for instance during operation to permit determination of a type of object in the field of the device.

According to one or more particular examples, the sensing of the electrical or electromagnetic signal may be based on sensing variations in a complex impedance of the generator circuit.

This embodiment may enable more robust or reliable detection of objects or entities in the RF field, as distinguished from non-object related artefacts which may be present in the generator circuit signal. By measuring variations in the total complex impedance of the sensed signal, which includes resistance and reactance parts, movement object detection can be made more robust against movement artefacts.

The complex impedance can be expressed as $Z=R+jX$, where R is the resistance and X is the reactance. This can be measured based on sensing variations in amplitude and/or phase of the current in the circuit comprising the electrodes 18*a*, 18*b*.

A further main sensing approach according to one or more embodiments is inductive-type sensing.

For example, according to one more embodiments, the cleaning unit 10 may comprise a conductor arrangement which takes the form of at least one inductive coil or loop.

Sensing of the electrical or electromagnetic signal may comprise sensing variations in an inductance of a circuit containing the at least one coil. This may be a generator circuit or a separate sensing circuit.

Inductive sensing is based on the principle of electromagnetic induction based on eddy currents. A coil or loop antenna is driven with an alternating current (for example at a resonant frequency of the coil), which thereby induces an alternating magnetic field. The coil may be driven at an RF frequency for example to generate an RF field with a cleaning functionality. The same field may be used for the sensing.

The generated RF field penetrates beneath the surface of foreign objects which are brought within it. For foreign objects which are conductive (including metal objects, and also water-containing foreign bodies and substances), the field induces eddy currents in the material beneath the surface. These eddy currents in turn generate secondary magnetic fields which are detectable at the cleaning unit 10, either using a second sensing coil, or based on measuring induced changes in electrical characteristics of the primary generator coil current.

The sensing may thus be more specific and robust in the present of water.

Furthermore, while capacitance (or impedance) type sensing is mostly confined to sensing at the surface of foreign bodies, inductive sensing allows penetration beneath the surface of bodies. The eddy currents induce a magnetic field out of phase with the primary field emitted by the coil, which results in a measurable reduction of the inductance in the coil.

An example cleaning unit 10 configured for inductive sensing is schematically illustrated in FIG. 6. The cleaning unit 10 comprises a conductor arrangement which comprises a first (RF transmit) coil 19*a*, and a second (receiver) coil 19*b*, the second coil inset concentrically within the first coil. Each coil in this example comprises a single loop (single winding), however in other examples, the coil may comprise a plurality of loops or windings.

An alternating current drive signal is generated by the RF generator (not shown in FIG. 6) which is supplied to the transmit coil 19*a*. The current produces an alternating magnetic field.

As illustrated schematically in FIG. 7, if an electrically conductive body 32 is close to the coil, eddy currents 42 will be induced in the body, which produces an opposing (magnetic) field which can be measured using the second (receiver) coil 19*b*.

The inductor coils 19*a*, 19*b* are integrated in the support structure 12 of the cleaning unit 10, beneath the support surface 13. They may for example be embedded in the support structure beneath the support surface. However, this is not essential and in other example, the coil(s) may be carried on the surface 13 of the support structure of the cleaning unit.

By way of one example, the transmit 19*a* and receive 19*b* coils may be embodied in the form of a single layer metallization on a foil (e.g. kapton) substrate. Such a manufacturing approach is low cost and reliable and would be suitable for incorporation into an oral cleaning unit body.

Figure 8:
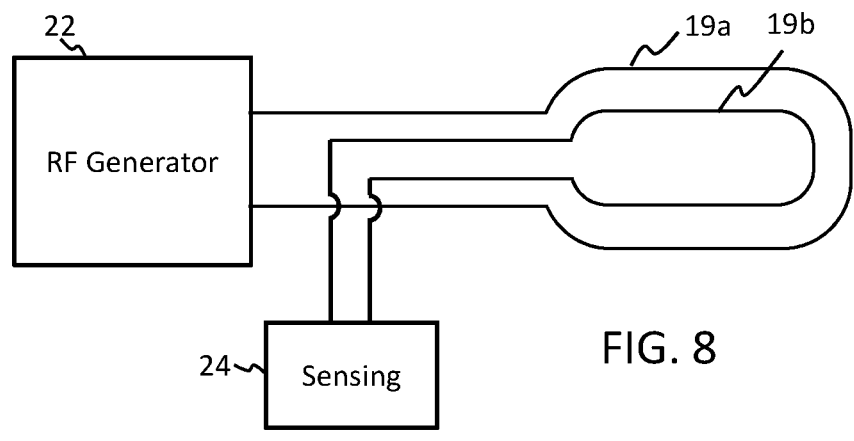
FIG. 8 illustrates a circuit arrangement of two inductive coils for an example oral care device.

The circuit arrangement of the dual coil example of FIG. 6 and FIG. 7 is schematically illustrated in FIG. 8. As shown, the RF generator 22 is electrically coupled in parallel across the generator coil 19*a*. A sensing unit 24 is electrically coupled to the sensing or receive coil 19*b* and adapted to measure variations in electrical characteristics of the receive coil. For example, the sensing unit 24 may monitor variation in an inductance of the sensing coil based on electrical characteristics of the sensing coil circuit. The senor unit may for example monitor an amplitude and/or frequency of the sensing coil current.

In further alternative examples, the cleaning unit 10 may comprise a conductor arrangement which includes a single inductive coil or loop which is used both for RF field generation and for sensing.

Figure 9:
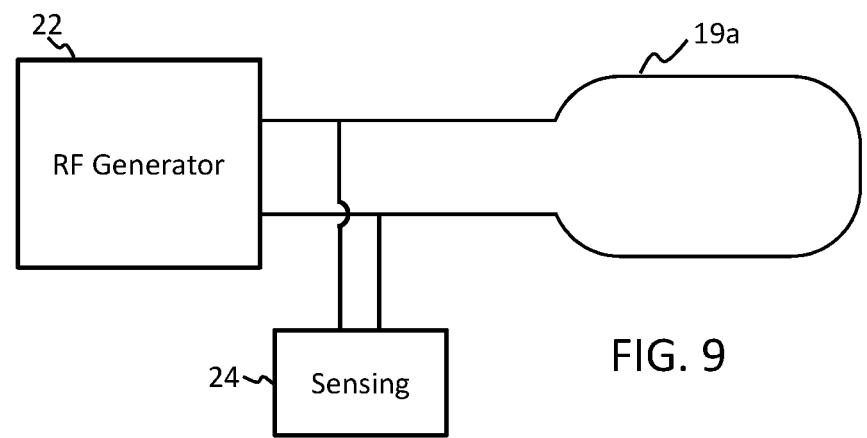
FIG. 9 illustrates a circuit arrangement with a single inductive coil for an example oral care device.

The circuit arrangement of one such example is shown in FIG. 9. The RF generator 22 and the sensing unit 24 are both electrically coupled to the same single inductive coil 19a. In the example illustrated, the sensing unit is connected in parallel across the coil, however in alternative examples it may be connected in series.

If only one coil 19a is used for both RF field generation and for passive inductance sensing, the system may be operated in a transmit/receive duty cycle. Here, the system is switched alternately between an active RF mode and an RF sensing mode. Switching can be achieved for example by operating the RF generator/oscillator in FIG. 8 with pulsed RF fields in a duty cycle drive scheme.

Sensing by the sensing unit 24 can be performed in the same way as discussed above for the dual-coil example, based on sensing electrical characteristics such as frequency, amplitude, and/or power of the coil current, for example to detect variations in an inductance of the coil 19a.

Instead of using a duty cycle drive scheme, simultaneous sensing and signal generation can be achieved in further examples based on monitoring variation in an impedance of the generator circuit while driving the coil 19a with the drive signal. Simultaneous sensing and field generation can be based for example on monitoring variations in amplitude or frequency of the generator circuit drive signal while the coil is being driven with the drive signal. The secondary fields in the eddy currents interact with the primary field generated by the coil and induce a change in the electrical characteristics of the coil current during signal generation. This can be measured by the sensing unit 24 while RF field generation is ongoing.

The penetration depth of the RF fields is dependent upon frequency. By varying frequency of the generated fields therefore, different depth levels within structures or tissue can be probed. Furthermore, the frequency of the eddy currents induced also depends upon depths, meaning that for a single frequency of the generated RF field, the responses at different depths can be distinguished based on their frequency. The strength of secondary response signals may be related to their conductivity, allowing an indication of the material type to be determined.

The relationship between field frequency, f, and foreign object material penetration depth, δ, can be expressed by the following equation:

$$\delta \approx \frac{1}{\sqrt{\pi f \mu \sigma}}$$

where δ is depth of penetration, f is frequency of the RF field, μ is magnetic permeability of the material, and σ is conductivity of the material.

Thus penetration depth increases as frequency decreases.

Increasing the distance between foreign material layers of different conductivity and the coil also causes a time delay to the detected eddy currents, which appears as an increasing phase shift at raising frequencies, which increases the detectability at greater depths. Different types of foreign object will be at different depths relative to the tooth brush head or biting surface of a brushing mouthpiece.

An advantage of inductive sensing embodiments compared to capacitive sensing embodiments is that the sensing may be more robust against potential signal artefacts caused for instance by movement of electrodes or presence of fluids such as toothpaste in the RF field.

The eddy current response sensed at the one or more coils 19a, 19b is dependent upon the conductivity of the material in which the eddy currents are induced, allowing the type of structure or body to be potentially sensed based on the sensing data.

As discussed above, the cleaning functionality of the device 8 may be adapted by the controller 28 based on the sensing data from the controller 28. For example, the RF field intensity or frequency may be adapted based on the sensing information. Additionally or alternatively, other cleaning functionality (e.g. mechanical cleaning actions) may be adapted based on sensing information.

Figure 10:
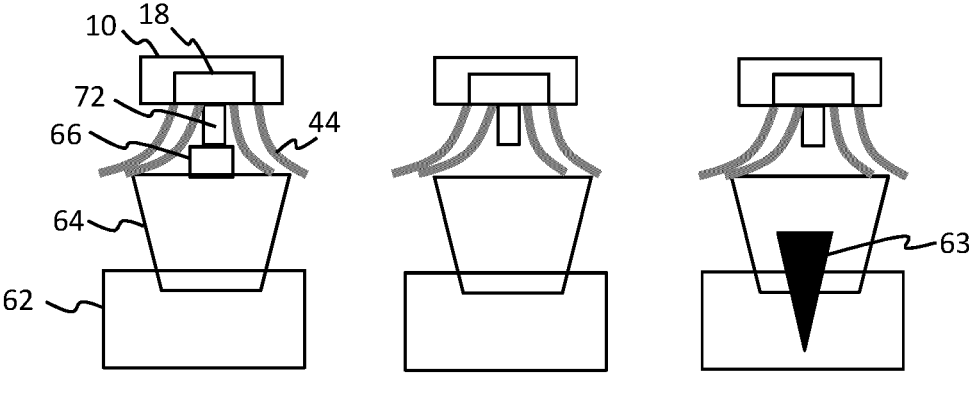
FIG. 10 illustrates adaptation of a cleaning mode according to sensed object detection.

An example is schematically illustrated in FIG. 10 which shows an example cleaning unit of an example care device 8. The device in this example comprises bristles 44 protruding from a surface of the cleaning head 10. It additionally comprises a fluid nozzle 72 or jet arranged to project a fluid stream for a further cleaning function. This provides a fluid irrigation or active fluid flossing mechanism. The fluid ejections can be activated and deactivated and a force (e.g. flow rate) of the fluid ejection may be adjustable.

Difference scenarios are shown in each of the three drawings of FIG. 10. Each shows the cleaning unit 10 of the oral care device held above the crown of a tooth 64. The gum 62 beneath each tooth is also shown.

In the first case of FIG. 10 (left drawing), the tooth 64 comprises a metal bracket 66 at the natural tooth crown. This protrudes from the surface of the tooth and into the bristle field of the cleaning unit/head 10. In the second case (middle drawing), there is a stainless steel metallic crown at the surface of the tooth. In the final case (right drawing), the tooth includes a metallic screw, pin or dental implant 63.

In the first and second cases, the metallic objects at the tooth crown may be detected by the controller 28 processing the sensing data, based for example on the strength of signal return, which will be relatively high due to the metallic material of the bracket 66 and the crown, and their relative proximity to the sensor electrodes 18 or coil(s) in the device cleaning unit 10. It may thus be determined from the sensing data that there are exposed metal objects in the RF field but at different depth levels relative to the sensor electrodes and nozzle. Based on this, the fluid jet 72 characteristics may be adapted, e.g. to provide a higher jet power to clean the difficult-to-reach areas on and around the metal structures.

In the third case (right-hand drawing of FIG. 10), the controller 28 may detect based on the sensing data that there is a metal object, but implanted beneath the surface. In this case, no adaptation of the jet 72 characteristics may be applied, To enable the high specificity of the sensing, for distinguishing different objects and their relative positioning, the sensed interaction signal strength and other characteristics (e.g. frequency, for the inductive sensing case) may be used. In some advantageous embodiments, additionally an angle of deflection of bristles 44 and/or an orientation or location of the cleaning unit 10 may be used to further inform determination of the type and position of any objects which are detected.

Figure 11:
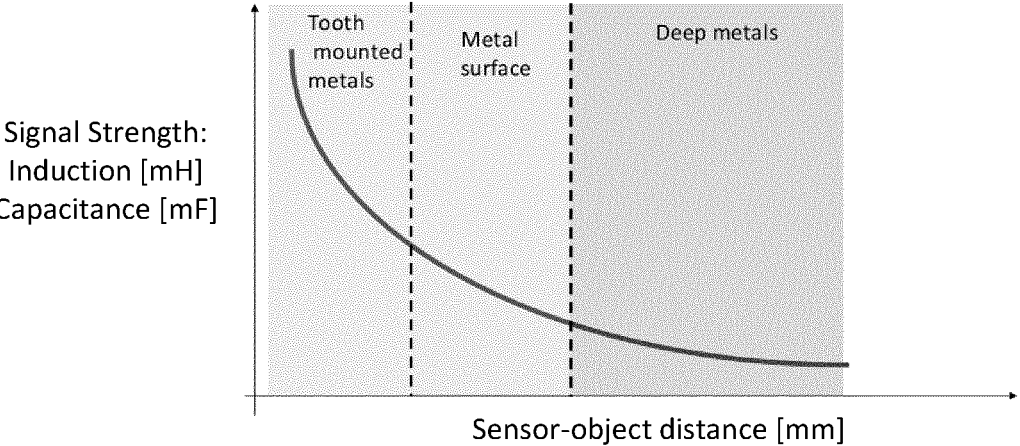
FIG. 11 shows a graph illustrating the relationship between detected sensed interaction signal strength at the coil or electrodes as a function of distance to the detected object.

As mentioned, to detect the depth of a detected object, the strength of the sensed interaction signal received at the electrodes 18a, 18b or coil(s) 19 may be used to inform this. FIG. 11 shows a typical relationship between sensed signal strength (y-axis; units: mH for inductive sensing, mF for capacitive sensing) and the distance (x-axis; units: mm)

between the electrodes or coil(s) and the detected object. This relationship can be used to assist in determining whether a metal or foreign object is exposed or non-exposed, and therefore for tailoring any response in terms of adaptation of the device 8 cleaning mode or characteristics.

The principles of the present invention can be applied in a range of different types of oral care device.

According to one or more embodiments, the oral care device 8 may further comprise a body portion which houses the RF generator 22 and the controller 28 (and any sensing unit 24), the body portion being mechanically and electrically coupleable to the cleaning unit 10. The body portion may form a handle for the device for example.

The cleaning unit 10 may be releasably coupleable to the body portion in some examples. For example, the cleaning unit may be a head for a toothbrush device, a flossing device, an oral irrigation device or any other oral care device, in some examples.

According to one or more embodiments, the cleaning unit 10 may further comprise a plurality of bristles for cleaning teeth, extending outward from a support surface 13 of the cleaning unit. The device may be a toothbrush device for instance, or a partial or full tooth arch brushing mouthpiece unit comprising bristles.

According to one or more embodiments, the device 8 may further comprise a mechanical oscillation mechanism arranged to oscillate a support surface 13 of the cleaning unit 10 at a first frequency, and wherein oscillation at said first frequency causes the bristles to oscillate.

By way of non-limiting example, the oral care device according to embodiments of the present invention may be any of the following:

a toothbrush device (e.g. powered toothbrush);

an oral irrigator device;

a flossing device;

a combined brushing and flossing device; or a mouthpiece device, e.g. brushing mouthpiece device.

Figure 12:
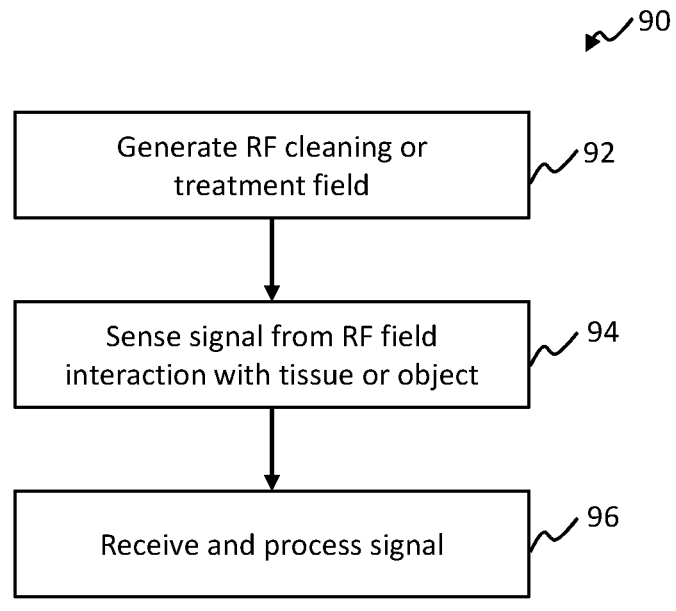
FIG. 12 shows an example method in block diagram form.

Examples in accordance with a further aspect of the invention provide a method 90. Steps of the method are outlined in block diagram form in FIG. 12.

The method 90 comprises generating 92 and supplying an RF drive signal to at least one conductor arrangement of an oral cleaning unit, the cleaning unit for receipt in an oral cavity of a user, and the conductor arrangement adapted to generate an RF field responsive to receipt of the RF drive signal, and the RF field adapted to perform an oral cleaning function when the cleaning unit is received in an oral cavity.

The method further comprises sensing 94 an electrical or electromagnetic signal caused by interaction of the generated RF field with foreign objects in the oral cavity. The sensing may be done by re-using elements of the RF generation circuit.

The method further comprise receiving and processing 96 the sensed electrical and electromagnetic signal.

The method may further comprise an initial step of inserting the oral cleaning unit 10 into the oral cavity of a user, and performing the remaining steps of the method with the cleaning unit received in the mouth of the user.

Implementation options and details for each of the above steps may be understood and interpreted in accordance with the explanations and descriptions provided above for the apparatus aspect of the present invention (i.e. the oral care device aspect).

Any of the examples, options or embodiment features or details described above in respect of the apparatus aspect of this invention (in respect of the cleaning may be applied or combined or incorporated into the method aspect of the invention.

Examples in accordance with a further aspect of the invention also provide a computer program product comprising computer program code, the computer program code being executable on a processor or computer, wherein, when the processor or computer is operatively coupled with an RF generator of an oral care device, the RF generator operatively coupled to at least one conductor arrangement, the code is configured to cause the processor to perform a method in accordance with any example or embodiment outlined above or described below, or in accordance with any claim of this application.

The invention relates to the detection of foreign objects in the oral cavity. Possible uses of this detection ability may be summarized as:

(i) Adjusting the oral health care routine (e.g. brushing and flossing). For example, if metallic dental materials are detected in the mouth, the brushing routine can be automatically adjusted to give a focused and/or prolonged brushing time in those areas, to assist in removal of sheltered bacterial biofilms.

(ii) Personalization of a coaching system, giving education and feedback.

For example, advice on different brushing or flossing techniques can be given. This may be part of a training mode.

(iii) Improved location sensing, by having certain teeth confirming the exact location, possible to the level of individual tooth accuracy. In-mouth position sensing may be based on the location of known foreign objects in the mouth.

(iv) Orthodontics detection. An example is the detection of an orthodontic appliance in the mouth, which indicates that an orthodontic brushing routine should be implemented in the control app, which is significantly different than a normal brushing routine for normal (i.e. non-orthodontic individuals). Usually the recommended routine by dental practitioners regarding brushing is two minutes twice a day, while an orthodontic patient is recommended to brush 4 times a day, and 4 minutes (at least 3 minutes) of brushing time that consists of the regular 2 minutes and an additional 2 minutes of brushing the orthodontic appliances from two opposing directions or angles, 45 degrees up and down.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. An oral care device, comprising:
a cleaning unit for receipt in an oral cavity of a user, the cleaning unit comprising at least one conductor arrangement, adapted to generate an RF field responsive to receipt of an RF drive signal;
an RF generator arranged to supply the RF drive signal to the at least one conductor arrangement to induce an RF field, the RF field adapted to perform an oral cleaning and/or treatment function during use; and
a controller arranged to receive and process a sensed electrical or electromagnetic signal caused by interaction of the generated RF field with foreign objects in the oral cavity, and to adjust an operation of the oral care device based upon the received and processed signal, wherein the electrical or electromagnetic signal is sensed using the at least one conductor arrangement used to generate the RF field,
wherein the at least one conductor arrangement and the RF generator together form an RF eneratic ad whe vin ensing of the electrical or electromagnetic signal is based detecting variation in one or more electrical characteristics of the RF generation circuit,
wherein the conductor arrangemen omprises a east one pair of electrode the electrodes spaced from one another, and the electrodes adapted to generate an RF field in an area around and between the electrodes sive to receipt of an altematin drive signal applied to the electrodes.

2. The oral care device as claimed in claim 1, wherein the controller is adapted to recurrently or continuously adjust an operation of the oral care device based upon the received and processed signal.

3. Anil The oral care device as claimed in claim 1, wherein the controller is adapted to process the sensed electrical or electromagnetic signals to determine or identify an object or entity present in the generated RF field.

4. The oral care device as claimed in claim 1, wherein the oral care device is operable in a plurality of mechanical and/or fluidic cleaning or treatment modes, and wherein the controller is adapted to configure or select the cleaning or treatment mode based on the sensed electrical or electromagnetic signal.

5. The oral care device as claimed in claim 1, wherein oral cleaning unit comprises a support structure with a support surface, and wherein the at least one pair of electrodes (18a, 18b) is arranged protruding outward from the support surface.

6. The oral care device as claimed in claim 1, wherein the sensing of the electrical or electromagnetic signal is based on sensing variations in a complex impedance of a circuit comprising the electrodes.

7. The oral care device as claimed in claim 1, wherein the conductor arrangement comprises at least one inductive coil or loop.

8. The oral care device as claimed in claim 7, wherein the conductor arrangement comprises a single inductive coil or loop which is used both for RF field generation for cleaning or treatment and also for sensing.

9. The oral care device as claimed in claim 7, wherein sensing of the electrical or electromagnetic signal comprises sensing variation in an inductance of a circuit comprising the at least one coil.

10. The oral care device as claimed in claim 8, wherein the at least one coil or loop is operated with a transmit/receive duty cycle drive scheme, wherein the coil is alternated between a signal generation phase for treatment or cleaning and a signal sensing phase.

11. The oral care device as claimed in claim 8, wherein the cleaning unit comprises a support structure having an outer support surface, and wherein the at least one inductive coil is integrated in the support structure, beneath the support surface, for example embedded in the support structure beneath the support surface.

12. The oral care device as claimed in claims 1, wherein the controller is adapted to process the sensed electrical or electromagnetic signal to detect presence of a metal object in the oral cavity.

13. The oral care device as claimed in claim 1, wherein the device further comprises a body portion which houses the RF generator and the controller, the body portion being mechanically and electrically coupleable to the cleaning unit.

14. A method, comprising:
generating and supplying an RF drive signal to at least one conductor arrangement of an oral cleaning unit, the cleaning unit for receipt in an oral cavity of a user, and the conductor arrangement adapted to generate an RF field responsive to receipt of the RF drive signal, and the RF field adapted to perform an oral cleaning and/or treatment function during use;
sensing an electrical or electromagnetic signal caused by interaction of the generated RF field with foreign objects in the oral cavity, wherein the sensing is performed using the at least one conductor arrangement used to generate the RF field; and
receiving and processing the sensed electrical and electromagnetic signal, and adjusting an operation of the oral care device based upon the received and processed signal.

15. A computer program product comprising computer program code, the computer program code being executable on a processor or computer, wherein, when the processor or computer is operatively coupled with an RF generator of an oral care device, the RF generator operatively coupled to at least one conductor arrangement, the code is configured to cause the processor to perform the method according to claim 14.

\*   \*   \*   \*   \*